United States Patent [19]
Marques

[11] Patent Number: 5,525,119
[45] Date of Patent: Jun. 11, 1996

[54] MECHANISM FOR GRADUALLY AND SMOOTHLY VARYING ROTATIONAL SPEED BETWEEN A DRIVE MEMBER AND A DRIVEN MEMBER

[76] Inventor: Jesus Marques, 1083 Chemin de l'Espagnol, 06250 Mougins, France

[21] Appl. No.: 290,980

[22] PCT Filed: Feb. 25, 1993

[86] PCT No.: PCT/FR93/00188

§ 371 Date: Aug. 24, 1994

§ 102(e) Date: Aug. 24, 1994

[87] PCT Pub. No.: WO93/17260

PCT Pub. Date: Sep. 2, 1993

[30] Foreign Application Priority Data

Feb. 25, 1992 [FR] France .................. 92 02428

[51] Int. Cl.⁶ .................................................. F16H 15/20
[52] U.S. Cl. .................................................. 476/51
[58] Field of Search ........................................ 476/22, 51

[56] References Cited

U.S. PATENT DOCUMENTS

| | | | |
|---|---|---|---|
| 776,455 | 11/1904 | Christie | 476/51 |
| 1,844,239 | 2/1932 | Boehme et al. | 476/51 X |
| 3,158,041 | 11/1964 | Rae | 476/51 X |
| 3,286,537 | 11/1966 | Riley | 476/51 |
| 4,183,253 | 1/1980 | Borello | 476/51 X |

FOREIGN PATENT DOCUMENTS

| | | | |
|---|---|---|---|
| 61110 | 3/1955 | France . | |
| 2218005 | 9/1974 | France . | |
| 2648808 | 5/1978 | Germany . | |
| 797511 | 7/1958 | United Kingdom | 476/51 |

*Primary Examiner*—Allan D. Herrmann
*Attorney, Agent, or Firm*—Ostrolenk, Faber, Gerb & Soffen

[57] ABSTRACT

A mechanism for varying rotational speed between two rotary shafts, namely a drive shaft and a driven shaft. The mechanism is designed to replace gear boxes which are generally used in motor vehicles. The mechanism includes two truncated cones with concave surface generatrices attached to a shaft secured to the engine and to a shaft secured to the transmission members, respectively. A roller made up of an inverted double cone having convex surface generatrices is mounted on an arm via a pin and arranged to rotationally interconnect the truncated cones by means of the adherence caused both by the choice of materials and by the bearing force exerted on the truncated cones by the roller through a suitable pressure member. The roller is translationally movable over the convex surfaces of the truncated cones by means of a suitable position varying system for adapting the drive ratio to the various parameters which influence the operation of the whole mechanism, according to its position. The mechanism is particularly suitable for use in motor vehicles.

11 Claims, 2 Drawing Sheets

5,525,119

MECHANISM FOR GRADUALLY AND SMOOTHLY VARYING ROTATIONAL SPEED BETWEEN A DRIVE MEMBER AND A DRIVEN MEMBER

BACKGROUND OF THE INVENTION

1. Field of the Invention

The present invention relates to a mechanism for gradually and smoothly varying the rotational speed between a driving member and a driven member.

2. Description of the Related Art

It is sometimes necessary not to interconnect the driving shaft directly to the movement transmission members. This is all the more true when there is an internal combustion engine which cannot be started when engaged since it provides an appreciable torque only from a certain rotational speed.

The maximum driving torque available from a given engine is approximately constant, while the resistance to be overcome to ensure movement can vary continuously. In a motor-car, the propelling power must be equal to the repelling power so that it can move at a determined speed. The repelling torque varying continuously with the profile of the road, it would be desirable that the drive ratio between the rotational speeds of the engine and of the propeller shaft be responsive to the profile fluctuations, which amounts to having continuous gear shifting.

To vary the drive ratio, the following are generally used : gear boxes having various compound trains which can be activated at will, gearboxes having epicycloidal trains, torque converters as well as driving belt propeller means.

The use of these systems requires one to frequently modify the drive ratio according to the changes of the repelling power, which causes the engine speed to be varied and entails a specific consumption more significant than with a constant speed.

The mechanism according to the invention allows to overcome such drawbacks by enabling the speed changes in a continuous and progressive way, while enabling the engine to run at a constant speed.

DETAILED DESCRIPTION OF THE PREFERRED EMBODIMENTS

Figure 1:
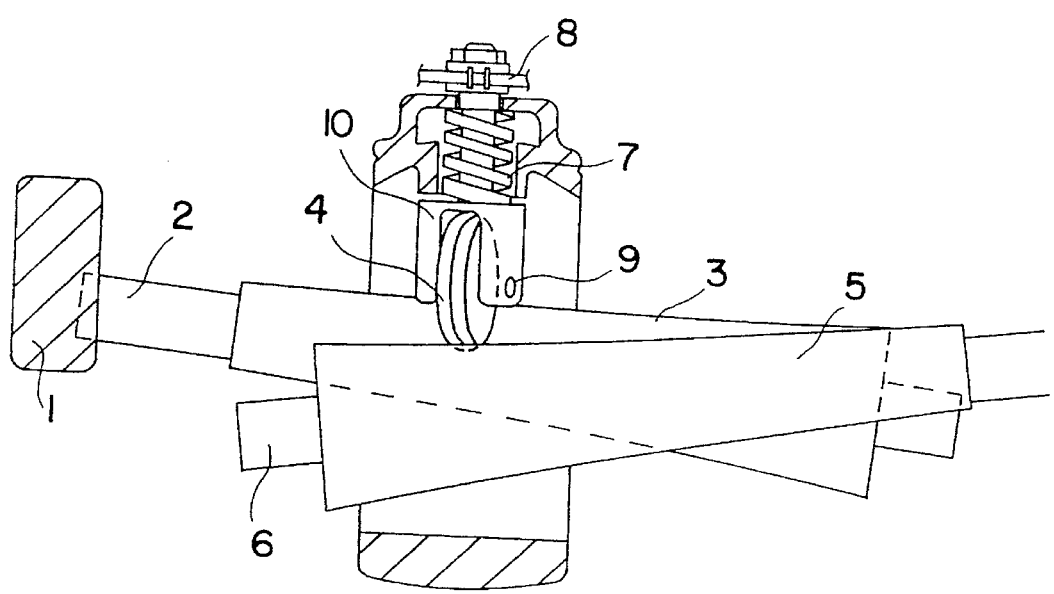
FIG. 1 represents the mechanism according to a preferred embodiment the present invention.

The mechanism represented in FIG. 1 comprises a truncated cone (3) attached to a shaft (2) rotationally driven by a driving member (1), and a truncated cone (5) mounted on a shaft (6) attached to the movement transmission members. The truncated cones (3, 5), the generatrices of which form concave conic frustums, are mounted in an opposite configuration so that the narrow end of one can correspond to the wide end of the other one. The transmission of the rotational movement from the truncated cone (3) to the truncated cone (5) is effected by a roller (4). Roller (4) is composed of two inverted truncated cones sharing the same axle (a), the generatrices of which form convex conic frustums.

Adhesion of roller (4) on truncated cones (3, 5) is ensured by the force transmitted by a pressure member (7). Roller (4) can move laterally by means of a varying system (8) enabling it to slide the length of truncated cones (3, 5).

At the beginning of the start-up phase, roller (4) has one of its frustums in contact with the smallest diameter of the driving truncated cone (3) while the other one is in contact with the largest diameter of the driven truncated cone (5); such a configuration corresponds with the lowest ratio. Pressure member (7) must provide a pressure force sufficient to obtain an adhesion between roller (4) and truncated cones (3, 5) that is at least equal to the driving torque.

The adhesion is enhanced by use of materials having a high friction coefficient on the surface of truncated cones (3, 5) and roller (4).

The use of truncated cones requires converging vertices for each position of roller (4). This is achieved by giving the frustums of each truncated cones (3, 5) and roller (4) a particular radius of curvature.

The use of concave or convex shapes enables the vertex of truncated cones (3, 5) to be moved along their respective axles while achieving a perfect convergence of the vertices for each position occupied by roller (4).

Figure 2:
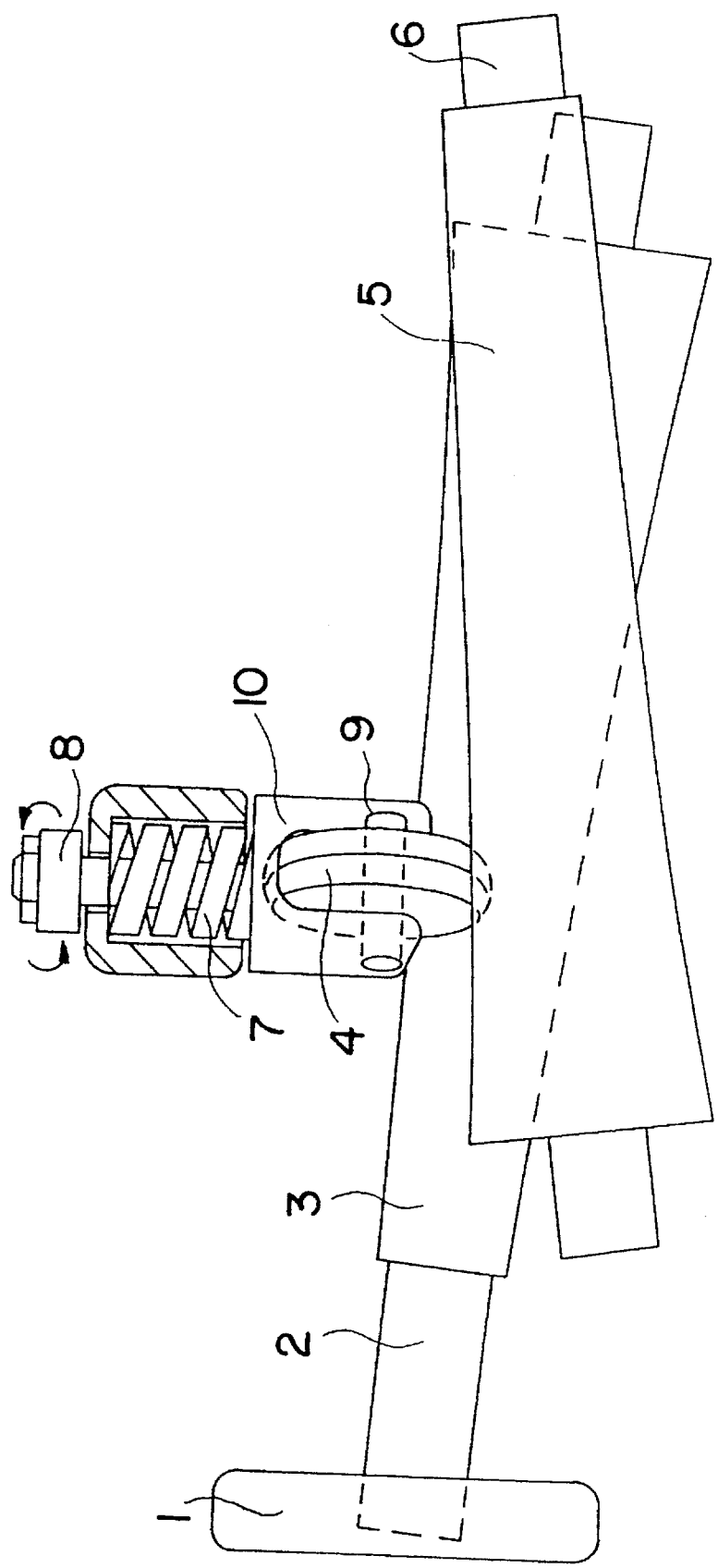
FIG. 2 shows the speed-varying mechanism according to a preferred embodiment of the present invention.

When it is desired to increase the rotational speed of the driven shaft (6), it is sufficient to vary the roller position (4) by having it slide along truncated cones (3, 5) by means of a varying system (8). The drive ratio is gradually varying to pass from the lowest ratio to the highest ratio and vice versa by tilting roller 4 around its vertical axis, as shown in FIG. 2.

This system allows continuous gear changing without requiring the changes in the engine speed which can be used in the range of maximum torque. It then becomes worthwhile to use an engine having an important torque for a low specific consumption. This configuration allows rapid accelerations and high speeds which can be compared to those of more powerful propelling systems, all the while keeping the engine speed within a range of use favoring low consumption. Accordingly, the longevity of the engine is greatly increased.

Similarly, the controlled variation of the drive ratio by any system allows for a powerful engine braking as soon as the accelerator pedal is released, which increases the longevity and the efficiency of the brake system. This system enables significant safety improvements.

The mechanism according to the invention is particularly adapted for the motor vehicles.

I claim:

1. A mechanism for a continuous variation of the rotational speed between a driving member and a driven member comprising;

a driving member;

a rotatable driving shaft mounted to the driving member and having an axial direction;

a driving cone engaging and axially aligned with the driving shaft, the driving cone being truncated and having a surface with a concave generatrix and a tapering direction;

transmission members;

a rotatable transmission shaft mounted to the transmission members and having an axial direction, the axial direction of the second shaft being divergent from the axial direction of the first shaft;

a transmission cone engaging and axially aligned with the transmission shaft, the transmission cone having a surface with a concave generatrix and a tapering direction substantially opposite to the tapering direction of the driving cone; and a roller engaging the driving cone and the transmission cone and having an axis and an outer surface with a driving side and a transmission side, each of the two sides being in the shape of a truncated cone, the two cones being joined at the bases of the codes and having convex surface generatrices the driving side and the transmission side of the roller being in contact with the driving cone and the transmission cone, respectively.

2. The mechanism according to claim 1, further comprising a pressure member for preventing any loss of adhesion between the roller surfaces and the driving cone and the transmission cone.

3. The mechanism according to claim 1, wherein variation of a roller position along the driving and transmission cones is obtained by the roller turning in one direction or the other around a vertical axis of the roller, the turned roller having a screwing movement on the driving and transmission cones to therefore enable the roller to be moved along the generatrices of the driving and transmission cones whereby an increase or decrease in a drive ratio is obtained according to the variation of the roller position.

4. The mechanism according to claim 2, wherein variation of a roller position along the axial directions of the driving and transmission cones is obtained by the roller turning around a vertical axis of the roller for the roller to have a screwing movement on the truncated cones to therefore enable the roller to be moved along the generatrices of the driving and transmission cones whereby an increase or decrease in a drive ratio is obtained according to the variation in the roller position.

5. The mechanism according to claim 1, further comprising means for translationally moving the roller along the surface of each truncated cone.

6. The mechanism according to claim 5, wherein each of the convex cone-shaped sides of the roller, the driving cone and the transmission cone has a vertex, the vertices of the sides of the roller converging with a respective one of the driver and transmission cone vertices in any position of the roller along the driver and transmission cone surfaces on which the roller is translationally moved.

7. The mechanism according to claim 1, wherein the roller axis defines an upper roller half and a lower roller half, and the roller sides on the lower roller half contact the driver and transmission cones.

8. A variable speed mechanism, comprising:

a drive shaft with a conical outer surface having a concave generatrix and being rotatable about a drive axis;

a transmission shaft with a conical outer surface having a concave generatrix and being rotatable about a transmission axis; and a roller having an axis and an outer surface in contact with the outer surface of the driving shaft and the outer surface of the transmission shaft for transmitting power between the driving shaft and the transmission shaft, the outer surface of the roller including two conical roller surfaces, each of the two conical roller surfaces having a convex generatrix.

9. The variable speed mechanism of claim 8, further comprising means for pressing the roller into contact with the outer surface of the driving shaft and the outer surface of the transmission shaft.

10. The variable speed mechanism of claim 8, further comprising means for changing an alignment of the axis of the roller with respect to the axes of the driving shaft and the transmission shaft for translationally moving the roller along the outer surfaces of the shafts.

11. The variable speed mechanism of claim 10, wherein each of the two conical roller surfaces and the outer surfaces of the shaft has a vertex, and projections of the vertices of the two conical roller surfaces converge with projections of the vertices of the respective outer surface of the shafts at any position of the roller when moved translationally along the outer surfaces of the shafts.

* * * * *